United States Patent
Thomsen et al.

(10) Patent No.: US 10,767,627 B2
(45) Date of Patent: Sep. 8, 2020

(54) METHOD FOR CONTROLLING A TORQUE PERFORMANCE OF AN ELECTRICAL PITCH MOTOR, AN ELECTRICAL PITCH-CONTROL SYSTEM AND USE THEREOF

(71) Applicant: DEIF A/S, Outrup (DK)

(72) Inventors: Jesper Thomsen, Outrup (DK); Christian Nielsen, Viborg (DK); Torben Rønnow, Herning (DK); Jacob Danielsen, Skive (DK)

(73) Assignee: DEIF A/S, Skive (DK)

( * ) Notice: Subject to any disclaimer, the term of this patent is extended or adjusted under 35 U.S.C. 154(b) by 149 days.

(21) Appl. No.: 15/753,210

(22) PCT Filed: Sep. 13, 2016

(86) PCT No.: PCT/EP2016/071487
§ 371 (c)(1),
(2) Date: Feb. 16, 2018

(87) PCT Pub. No.: WO2017/063804
PCT Pub. Date: Apr. 20, 2017

(65) Prior Publication Data
US 2018/0245567 A1    Aug. 30, 2018

(30) Foreign Application Priority Data
Oct. 15, 2015  (DK) .................... 2015 70660

(51) Int. Cl.
*F03D 7/02*  (2006.01)
*F03D 7/04*  (2006.01)
(Continued)

(52) U.S. Cl.
CPC ........... *F03D 7/0224* (2013.01); *F03D 7/043* (2013.01); *G05B 11/36* (2013.01);
(Continued)

(58) Field of Classification Search
CPC ....... F03D 7/0224; F03D 7/043; G05B 11/36; G05B 2219/42063; G05B 2219/41445; F05B 2260/76; F05B 2270/602
See application file for complete search history.

(56) References Cited

U.S. PATENT DOCUMENTS

| 2011/0181045 A1* | 7/2011 | Letas | F03D 7/0224 290/44 |
|---|---|---|---|
| 2012/0032442 A1* | 2/2012 | Wibben | G01R 11/56 290/44 |
| 2014/0217951 A1* | 8/2014 | Sugihara | G05B 19/19 318/600 |

OTHER PUBLICATIONS

International Search Report issued in PCT/EP2016/071487 daated Nov. 8, 2016, pp. 1-3.
(Continued)

*Primary Examiner* — Kawing Chan
*Assistant Examiner* — Bradley R Brown
(74) *Attorney, Agent, or Firm* — Jeffrey S. Melcher; Melcher Patent Law PLLC

(57) ABSTRACT

Method for control of the torque performance of an electric pitch motor (1). A control system (2) comprises a first unit (3) controlling the pitch angle of the rotor blade, a second unit (7) which compares a reference speed Sr with an actual speed Sa of the motor (1) rotational speed. The second unit (7) controls the motor (1) rotational speed, a third unit (10) which regulates the motor (1). The control system (2) comprises a first overload device (13) and a second overload device (14). The second overload device (14) receives an error-speed signal Se, which is the difference between Sr and Sa recorded by the second unit (7). The second overload unit (14) compares See with a maximum allowable speed value, Smax, and the second overload device (14) sends a signal to the motor (1) for the regulation of the torque performance.

7 Claims, 2 Drawing Sheets

(51) Int. Cl.
*G05B 11/36* (2006.01)
*H02P 23/00* (2016.01)

(52) U.S. Cl.
CPC ..... *F05B 2260/76* (2013.01); *F05B 2270/602* (2013.01); *G05B 2219/41445* (2013.01); *G05B 2219/42063* (2013.01); *H02P 23/0004* (2013.01); *Y02E 10/72* (2013.01)

(56) References Cited

OTHER PUBLICATIONS

Written Opinon issued in PCT/EP2016/071487 dated Nov. 8, 2016, pp. 1-5.

\* cited by examiner

METHOD FOR CONTROLLING A TORQUE PERFORMANCE OF AN ELECTRICAL PITCH MOTOR, AN ELECTRICAL PITCH-CONTROL SYSTEM AND USE THEREOF

The present invention relates to a method for controlling a torque performance of an electrical pitch motor in a system comprising an electrical pitch-control system said pitch motor controls a turbine blade, said pitch-control system comprises

- a first unit comparing a received reference pitch-angle Pr with an actual pitch-angle Pa of the turbine blade, said Pa-value is registered by and received from a resolver, and that the first unit further regulates the pitch-angle of the turbine blade according to the received pitch-angle values,
- after the first unit an electrically connected second unit said second unit compares a reference-speed Sr received from the first unit with an actual speed Sa of the rotational speed of the motor, said resolver measures and calculates the actual speed Sa which is send to the second unit and that the second unit regulates the rotational speed of the motor according to the received speed values
- after the second unit an electrically connected third unit comparing a reference torque Tr of the motor—said value is received from the second unit—with the actual torque Ta of the motor, said third unit further regulates the torque performance of the motor according to the received torque-references;
- said control system further comprises a first overload unit between the third unit and the motor.

The invention also relates to an electrical pitch-control system adapted to control a torque performance of an electrical pitch motor said pitch-control system comprises

- a first unit comprising a first summator adapted to compare a received reference pitch-angle Pr with an actual pitch-angle Pa of a turbine blade, said Pa-value is provided by a resolver, and that the first unit further comprises a first control unit adapted to regulate the pitch-angle of the turbine blade
- after the first unit an electrically connected second unit comprising a second summator adapted to compare a reference-speed Sr received from the first unit with an actual speed Sa of the rotational speed of the motor, measured by the resolver
- and a second a second control unit adapted to regulate the rotational speed of the motor and after the second unit an electrically connected third unit comprising a third summator adapted to compare the reference torque Tr of the motor—said value is received from the second unit—with the actual torque Ta of the motor, and that the third unit further comprises a third control unit adapted to regulate the torque of the motor
- said control system further comprises a first overload unit between the third unit and the motor.

The invention further relates to use of the electrical pitch-control system according to the invention for carrying out the method according to the invention.

Finally, the invention relates to use of the method according to the invention and according to the electrical pitch-control system for regulating a turbine blade of a wind turbine.

The electrical pitch system is operating the turbine blades of a wind turbine, WT. This is also called "pitch operation". An electrical motor is the actuator moving each individual blade. A typical WT has three turbine blades, whereas the numbers of individually operated motors are three. The electrical pitch system is also forming the interface to the electrical system of the nacelle, wherefrom it receives a set points for the pitch and the electrical power to operate the motors and thereby the blades.

There are two main features for the pitch system; one is the normal operation, where the pitch is used to optimize the lift of the turbine blade in all wind situations. The other is the very important main brake of the wind turbine. This brake function operates by moving the turbine blade from the operation position (from 0° to 30° depending on the actual average wind speed) to the vane position. This is 90°.

As the pitch system is the only brake for the wind turbine the three motors have to be controlled individually and independent from each other.

Thus, it is important that the rotor blades of the wind turbine can be pitched and adjusted properly.

If a wind turbine must be stopped each rotor blade is pitched in such a way that the leading edge of the wing is turned towards the wind whereby a braking of the wings of the wind turbine takes place. The adjustment of each wing takes place independently of the other wings.

The pitch-control systems are generally used to pitch/adjust the wings in relation to the wind or the water flow in such a way that the wings adapt the right angel in relation to the wind load alternative the water flow load.

During the production of power to the grid, there are two operations situations:

1) Production of power below nominal level: In this mode, the average wind speed is below a level, where the Wind Turbine rotor is able to harvest wind enough to produce nominal power. Therefor the pitch angle is set to the optimal values as a function of the average wind speed. For a standard wind turbine, the level will be +/−2° with respect to 0° pitch angle. The pitch speed will be very low, typically below 0.5°/s.
2) Production of power at nominal level: In this mode, the wind turbine rotor can harvest enough energy so that the Wind Turbine can produce nominal electrical energy, which is delivered to the grid. In this operation mode, the energy of the wind has to be limited by pitching the blades to a position, where the blade airfoil is less optimal. In this operating mode, the pitch angle is between 2 to 30°. The pitch speeds are typical higher at low absolute pitch angles and lower at higher absolute pitch angles. The pitch speed can be up to 10°/s, depending on the size of the WT, the gusts and the turbulence of the wind.

The turbulence is according to the guidelines for wind turbines calculated to 20% of the average wind speed.

When the nominal power has been reached, the pitch angel is corrected in order to limit the torque on the motor spindle.

Gusts are a critical factor for the rotor blades and for the pitch-control system as the rotor blades typically must be pitched/angled very fast when the rotor blades are moved into gusts.

A gust can have either positive or negative wind speed in relation to the average wind speed. Typically, a blade is passing through a gust within max. one second. When the next blade arrives to the gust area, the gust can be almost vanished and the gust influence of this rotor blade may be nearly zero.

The peak values obtained during a gust can reach a level of 100 to 300% of the nominal torque of the motor shaft. Thus, the pitch motor must withstand a torque that might be three times the necessary torque during normal operation in order to withstand those huge torque impacts, which typically take place 9-10 times per year.

Thus in the system known from prior art it is necessary to oversize the motor with a factor of 3 and thereby oversize the gear system and the frequency converter in order to meet the rare torque impacts which try to press the turbine blades out of the wind. It causes that the costs of production of the wind turbine are increased considerable.

The oversized motor- and gear-systems are used only for about 1% of the lifetime of a wind turbine and is therefore an expensive unit compared to the utilization factor. By an overload of e.g. 20% an integrator starts summing. If the level is getting to high, the torque is turned down to avoid a thermal overload situation.

In case the limit is set to 20% the integrator will be summing the difference between Tnom and Tact multiplied by 1.2, where Tnom is the nominal torque and Tact is the actual torque.

The maximum torque value that comes out of the integrator is Tmax, thus being the limiting torque level.

If Tact is greater than the limiting torque level, the torque value will change in such a way that the torque performance of the motor may be limited further. That is, the motor cannot provide the torque the situation actually requires. Therefor it is necessary with a very large motor in order to prevent the situation arises. As mentioned, the motor must be enlarged with a factor 3 to cope with the torque demand, which takes place in 1% of the cases (compared with the situation in 99% of the cases).

DE102010035055 discloses a method for controlling a pitch angel of a rotor blade. A pitch motor adjust the pitch angel comparing an actual pitch angel with a target-value for the pitch angel of the rotor blade. A target-value for the torque of the pitch motor is calculated and the pitch angel of the rotor blade is adjusted as a function of the actual rotational speed of the pitch motor, the calculated target-value for the torque and finally the target-value for the pitch angel of the rotor blade. By this technology, a more precise position of the pitch adjustment should be obtained.

However, it is desirable that the adjustment may be carried out faster than is the case for this system mentioned above and in such a way that an overload of the pitch motor is avoided. Further, it is desirable that it is possible to reduce the dimension of the pitch motor because of the load being reduced.

Therefore, it is desirable to limit the torque and thus reduce the dimension of the pitch-control system thus being able to select a smaller motor and in addition a smaller frequency converter.

It is an object of the present invention to provide a system which does not have the above disadvantages of the prior art or which at least provides a useful alternative to the prior art.

This is achieved with a method as mentioned in the introduction, and where the control system further comprises a second overload-unit said second overload unit receives an error- speed-signal Se which is the difference between Sr and Sa registered by the second unit said second overload unit compares Se with a maximal allowable speed value Smax, and that the second overload unit sends a signal to the motor for the regulating of the torque performance of the motor said signal is a function of the value of Se.

This is also achieved by a electrical pitch-control system a as mentioned in the introduction and where the control system further comprises a second overload-unit said second overload unit is adapted to receive an error-speed-signal Se which is the difference between Sr and Sa registered by the second unit, said second overload unit is adapted to compare Se with a maximal allowable speed value Smax, and that the second overload unit is adapted to send a signal to the motor at which signal the torque performance of the motor is regulated Thereby the rotational speed of the motor is used as an additional parameter to control the motor output/performance torque of the pitch motor. This parameter in conjunction with the incorporating of the second overload unit results in that a gust of wind is detected and handled much earlier compared with prior art. This will allow the motor's torque performance to be activated earlier so that the motor torque is utilized better.

Hereby the size of the motor can be reduced. By the reduced motor size, the rotor blade controlled by the motor in question is pitched out but in a very short time interval, which does not have a significant impact on the operation of the wind turbine.

The actual pitch position of the rotor blade may thus be moved away from a reference value and without the position results in an error mode. The control units sees to eliminate differences between the reference values and the actual values. If the reference values are changed the actual values are also changed in such a way that no difference occurs between the values. However, a difference between the actual position Pa for a turbine blade and the reference position Pr for the turbine blade does not cause an error message.

That is the rotor blade may follow the aerodynamic influence when a gust hits the rotor blade. The torque of the motor needs not to be so large that it is able to withstand the force on the turbine blade. This is in contrast to the todays known technology where a difference is not accepted between Pr and Pa.

Thus, the invention includes that a speed error is included as an additional parameter for regulating the torque of the motor.

The error-speed-signal Se is incorporated as an extra parameter as Se is the difference between the reference speed and the actual speed of the rotation of the motor: Sref-Sact. This value is taken from the summator of the second units and is treated in the second overload unit. A maximal allowable speed value Smax is defined in advance and the value is typically around 50-100 rpm. Preferably at 100 rpm.

The invention also results in that a gust is registered at an earlier stage and the size of the pitch motor may be reduced. Further the reduced motor torque will cause that the rotor blade is leveled out that is the actual pitch angel compared to the reference angel is permitted to be different without causing an error message, which will trigger an action that will result in the wind turbine stops producing power. It is noted that the resolver is connected between the motor and the first unit.

In a further advantageous embodiment according to claim 2 is the signal a maximum and preset torque value Tmax when Se is greater than Smax, and the signal to the motor is the torque value Ta received from the third unit when Se is less than or equal to Smax.

As a result of the extra overload unit is incorporated the level for counteracting a peak-torque is now reduced. From having to counteract a torque that is 3 times the nominal torque, it suffices to counteract 1.5-2 times the rated torque.

The torque performance value—the signal—to the motor is either Tmax—which is a constant and pre-defined value—or Ta.

The value for the torque Tmax is a function of the nominal torque value for the motor and Tmax is set to 1.5-2 times the nominal torque value preferably 1.5.

In a further advantageous embodiment according to claim 3, the first unit comprises a first summator for comparison of the reference pitch-angle Pr with the actual pitch-angel Pa of the turbine blade, and that the first unit further comprises a first control unit for regulating the pitch-angle of the turbine blade and that the second unit comprises a second summator for comparison of the reference speed Sr with the actual speed Sa and comprises a second control unit for regulating the rotational speed of the motor and that the third unit comprises a third summator for comparison of the reference torque Tr of the motor with the actual torque Ta of the motor and that the third unit further comprises a third control unit for regulating the torque of the motor.

This is an appropriate way to design the circuit in order to provide the process.

In a further advantageous embodiment according to claim 4 the second overload unit comprises a comparator and a switch said comparator receives the speed signal Se from the second unit, said comparator compares Se with the maximum value for the speed Smax and that the comparator sends a signal to the switch that forwards the signal in such a way, that a signal to the motor for adjustment of its torque is a maximum and predetermined torque value Tmax when Se is greater than Smax and that the signal to the motor is the torque value Ta, which is a torque value received from the third unit when Se is less than or equal to Smax. The comparator receives the error-speed-error signal Se from a summator belonging to the second unit.

The switch takes two different positions an upper position where the Ta value is used and a lower position where the Tmax value is used.

In a further advantageous embodiment according to claim 5 the switch comprises a selector by which a comparison of the incoming speed value of Se is evaluated in relation to Smax and in such a way that the value "fault" is chosen when Se is less than Smax and the value "true" is chosen when Se is greater than Smax.

The actual pitch-angel Pa of the rotor blade is different from the reference pitch-angel Pr when the torque performance is the Tmax value whereby the rotor blade is following the aerodynamic influence of a wind.

The control system is adapted to accept the value. That is by strong gusts where the motor provides a Tmax value the pitch angel may be different from the reference value, which is considered optimal and without any error of the system is triggered. The second overload unity causes that the torque of the motor is activated earlier than is the case for the known technology. This ensures that the peak-torque is present in a much shorter period of time than is the case if the second overload unity was not present. By this arrangement is it allowed that the rotor blade is levelled off and without causing damage to the system and/or causing an error.

The control system is connected to a main control system taking care of the overall management of the electrical components forming part of the control and of the regulation of a wind turbine.

The invention will be explained with reference to the drawing where

FIG. 1 shows a pitch-control system according to the invention comprising a first 13 and a second 14 overload unit.

Figure 1:
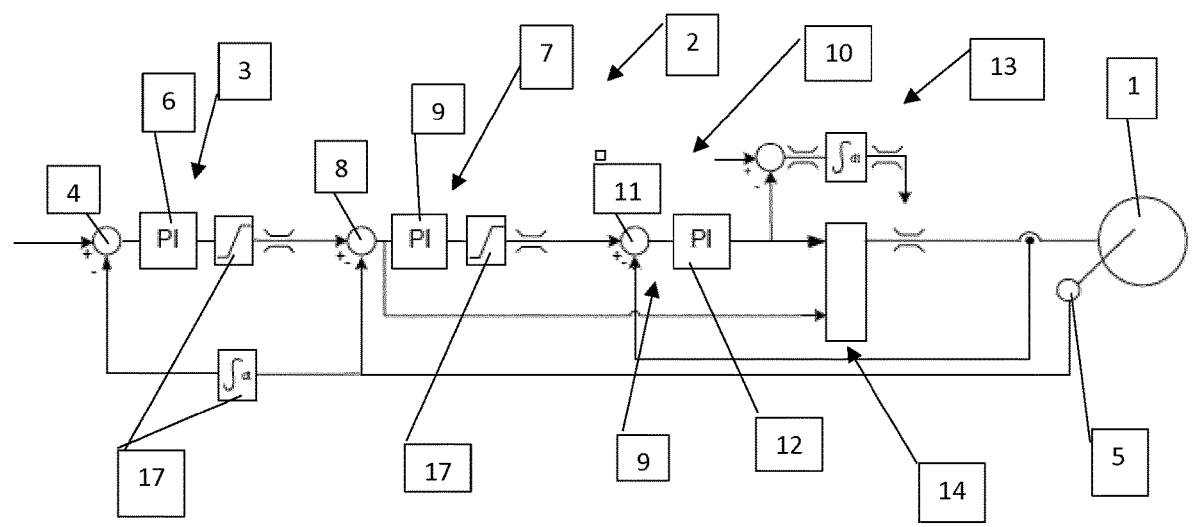
FIG. 1 shows a pitch-control system according to the invention comprising a first and a second overload unit.

The pitch-control system 2 controls the torque performance of an electrical pitch motor 1. The motor 1 controls a rotor blade—not shown at the figure. The control system 2 comprises a first unit 3 comprising a first summator 4 for comparing a reference pitch angel Pr with an actual pitch angel Pa of the rotor blade. A resolver 5 registers the Pa-value and is switched in between the motor 1 and the first unit 3. An integrator 17 is switched in between the summator 4 and the resolver 5. The first unit 3 also comprises a first control unit 6 for regulating the pitch angel of the rotor blade.

The first unit 3 is electrical connected to a second unit 7. An integrator 17 is switched in between the two units. The second unit 7 comprises a second summator 8 comparing a reference speed Sr for the rotational speed of the motor 1, and received from the first unit 3, with an actual speed Sa for the rotational speed of the motor 1. The resolver 5 registers the speed Sa and sends the value to the second unit 7. The second unit 7 also comprises a second control unit 9 regulating the rotational speed of the motor 1.

The second unit 7 is electrical connected to a third unit 10. An integrator 17 is switched in between the two units. The third unit 10 comprises a third summator 11 comparing a reference torque Tr of the motor 1—received from the second unit 7—with the actual torque Ta of the motor 1. Further, the third unit 10 comprises a third control unit 12 that contributes to regulate the torque of the motor 1.

The control system 2 also comprises a first overload unit 13 between the third unit 12 and the motor 1 and further a second overload unit 14. The first overload unit 13 works by well-known principles. The second overload unit 14 receives an error-speed-signal Se—which is the difference between the Sr and the Sa—from the summator 8 of the second unit 7. The second overload unit 14 compares Se with a maximum permissible value for the speed: Smax and the second overload unit 14 sends a signal to the motor 1 for setting the torque of the motor 1. Smax is set to a fixed value preferably 100 rpm.

When Se is greater than Smax the signal to the motor 1 is a maximum and predefined torque value Tmax. Is Se less than Smax the signal to the motor 1 is an actual torque value Ta, which is the torque value, received from the third unit 10.

The value of the torque Tmax is a function of the nominal torque value of the motor and 1.5-2 times greater than the nominal torque value. 1.5 is preferably chosen. Thereby the level for counteracting a peak level is reduced in such a way that it just corresponds to 1.5-2 times the nominal torque instead as is the case for prior art technology 3 times the nominal torque level.

Figure 2:
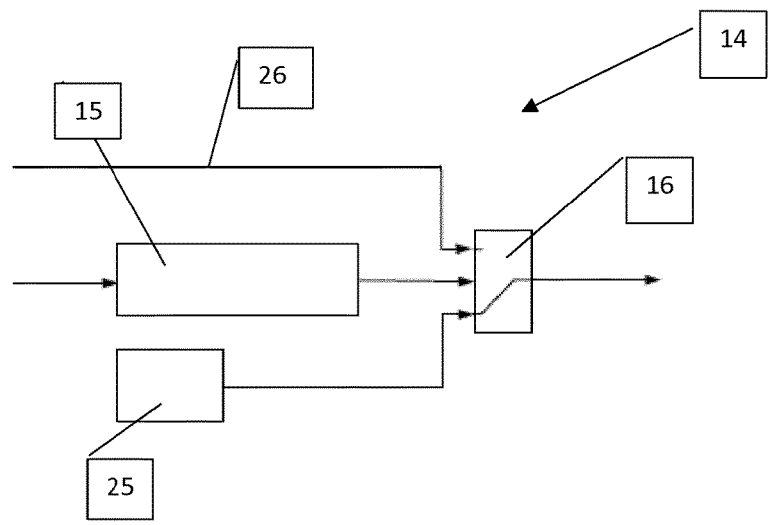
FIG. 2 shows a detailed drawing of the second overload unit outlined in FIG. 1.

The second overload unit 14 comprises a comparator 15 and a switch 16, see FIG. 2, in which the mode of action is described in more detail. The comparator 15 receives the speed signal Se—which is the difference between Sr and Sa—from the summator 8 of the second unit 7. The comparator 15 compares Se with the maximum value for the speed Smax and the comparator sends a signal to the switch 16. The switch 16 receives the signal from a first unit 25, in which the third unit 10 sends the signal: the constant Tmax, or from a connection 26, that delivers the value Ta. The switch 16 forwards the signal in such a way that the torque-setting signal to the motor 1 is Tmax when Se is greater than Smax. The signal to the motor 1 is the torque value Ta, which is the torque value, received from the third unit 10 when Se is less than Smax. Thus, the switch 16 takes up two positions: an upper position where the Ta value is used and a lower position where the Tmax value is used. A selector built into the switch 16 chooses the value "false" when Se is less than Smax and chooses the value "truth" when Se is larger than Smax.

Figure 3:
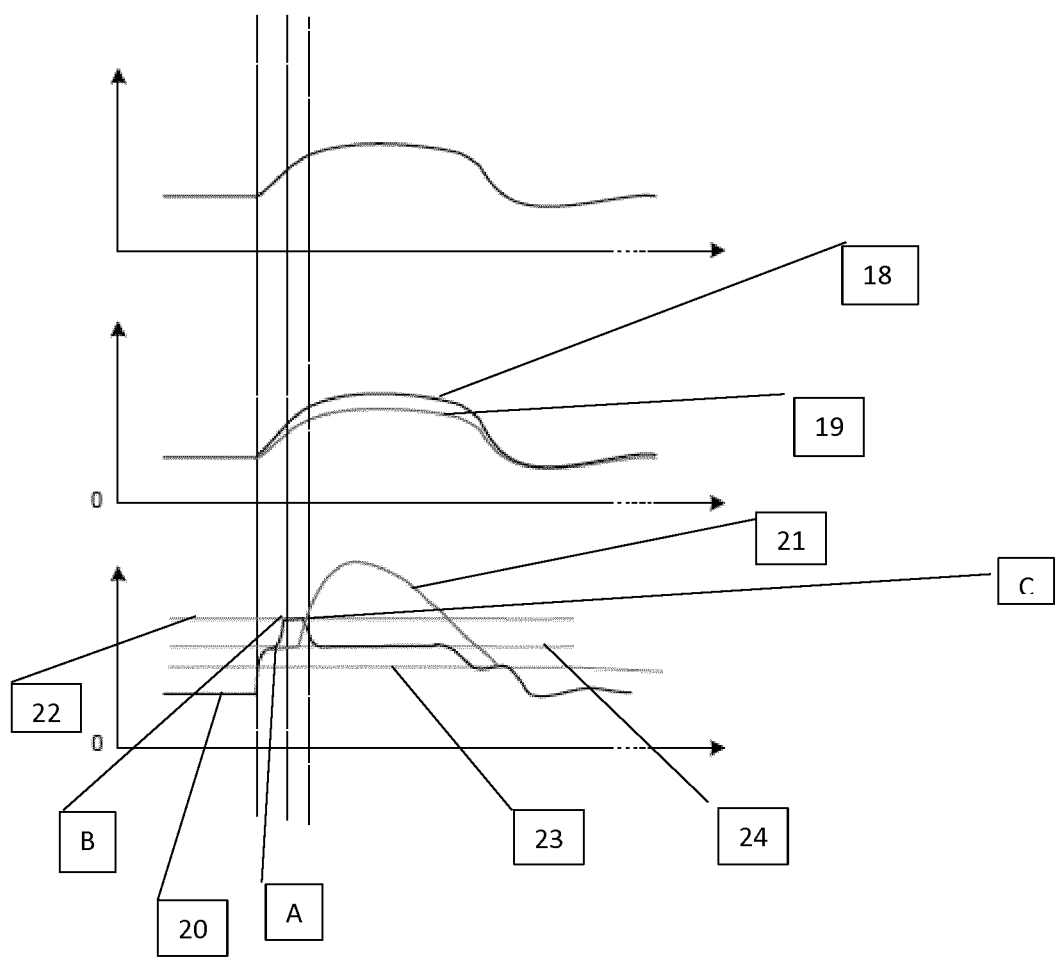
FIG. 3 shows the effect of the wind speed on the pitch angel and on the torque output of the pitch motor as a function of the time.

FIG. 3 shows the effect of the wind speed on the pitch angel and on the torque performance of the pitch motor as a function of the time and using the invention.

The connection of the second overload unit 14 is shown during normal operation and during overload, which takes place during a mighty gust. An important function of the second overload unit 14 is that the actual pitch position Pa is admitted to move away from the reference value for position Pr and without the position outcome is resulting in an error message. The upper FIG. 3 demonstrates the gust-situation. The time [sec] is specified out of the X-axis and the wind [m/sec] is specified out of the Y-axis. The gust starts at the vertical line leftmost.

The middle FIG. 3 shows the actual pitch angel Pa shown with reference number 18 and the reference pitch angel Ps is shown with the reference number 19. Pa may deviate from Pr without causing an error mode. The time [sec] is specified out of the X-axis and the pitch angel [°/s] is specified out of the Y-axis.

The bottom FIG. 3 shows the activating of the second overload unit 14 and the torque limitation at the line with reference number 20. The torque [Nm] is specified out of the Y-axis, and the time [sec] is specified out of the X-axis. The line with the reference number 21 shows the torque as it would be if the second overload unit 14 were not activated.

The vertical line at the top left shows the beginning of a gust of wind. The upper horizontal line 22 is the nominal torque multiplied by 1.5, the lower horizontal line 23 is the maximum nominal torque Tmax, while the middle horizontal line 24 is the nominal torque multiplied by 1.2.

The torque output of the motor 1 at the point A shows the situation where the torque output reaches the value 20% above the nominal torque, and the point B shows that the performance reaches the level: the nominal torque multiplied by 1.5; this is the point the second overload unit is activated. At the point C the value for Se is below Smax and the second overload unit is deactivated whereby the torque curve drops.

Thus, it is possible to activate the torque T earlier in the gust activity. Because the second overload unit is activated the maximum torque is present in a much shorter period of time than is the case in prior art.

The difference in the area limited by the line with ref. 20 relative to the area limited by the line with ref. 21 shows the difference in the applied torque and, therefore, that the overall torque performance/output, during the time the gust is present, is less when the second overload device 14 is incorporated. The torque—which is required when using the invention—is therefore considerably less. It is possible with the invention to enable torque output from the engine at an earlier point in the gust activity.

An example: The maximum acceleration is typically 8 to 10°/s for a pitch-control system. Since the available torque is 150%—compared with 300% as it is known from prior art—the pitch angling is more slowly and a speed of 4-5°/s can be expected. As the wind gusts typically are less than one second, the pitch error will be less than 4 to 5° according to this invention. This is also an advantage for the gearbox and the gear wheels when the level of the torque is limited from 300% to 150% compared with the prior art systems. Thus, these components can be reduced in dimensions.

The invention claimed is:

1. A method for controlling a torque performance of an electrical pitch motor in a system comprising an electrical pitch-control system, said pitch motor controls a turbine blade, said pitch-control system comprises:
    a first unit comparing a received reference pitch-angle Pr with an actual pitch-angle Pa of the turbine blade, said Pa-value is registered by and received from a resolver, and the first unit further regulates the pitch-angle of the turbine blade according to the received pitch-angle values;
    an electrically connected second unit comparing a reference-speed Sr received from the first unit with an actual speed Sa of the rotational speed of the motor, said resolver measures and calculates the actual speed Sa which is sent to the second unit and the second unit regulates the rotational speed of the motor according to the received speed values;
    an electrically connected third unit comparing a reference torque Tr of the motor received from the second unit with the actual torque Ta of the motor, said third unit regulates the torque performance of the motor according to the received reference torque Tr;
    a first overload unit between the third unit and the motor; and
    a second overload-unit receives an error-speed-signal Se which is the difference between Sr and Sa registered by the second unit, said second overload unit compares Se with a maximal allowable speed value Smax, and the second overload unit sends a signal to the motor for the regulating of the torque performance of the motor, said signal is a function of the value of Se.

2. The method according to claim 1, wherein the signal is a maximum and preset torque value Tmax when Se is greater than Smax, and the signal to the motor is the torque value Ta received from the third unit when Se is less than or equal to Smax.

3. The method according to claim 1, wherein the first unit comprises a first summator for comparison of the reference pitch-angle Pr with the actual pitch-angel Pa of the turbine blade, and the first unit further comprises a first control unit for regulating the pitch-angle of the turbine blade and the second unit comprises a second summator for comparison of the reference speed Sr with the actual speed Sa and comprises a second control unit for regulating the rotational speed of the motor and the third unit comprises a third summator for comparison of the reference torque Tr of the motor with the actual torque Ta of the motor and the third unit further comprises a third control unit for regulating the torque of the motor.

4. The method according to claim 1, wherein the second overload unit comprises a comparator and a switch said comparator receives the speed signal Se from the second unit, said comparator compares Se with the maximum value for the speed Smax and that the comparator sends a signal to the switch that forwards the signal in such a way, that a signal to the motor for adjustment of its torque is a maximum and predetermined torque value Tmax when Se is greater than Smax and that the signal to the motor is the torque value Ta, which is a torque value received from the third unit when Se is less than or equal to Smax.

5. The method according to claim 4, wherein the switch comprises a selector by which a comparison of the incoming speed value of Se is evaluated in relation to Smax and in such a way that the value "fault" is chosen when Se is less than Smax and the value "true" is chosen when Se is greater than Smax.

6. An electrical pitch-control system configured to control a torque performance of an electrical pitch motor, said pitch-control system comprises:
 a first unit comprising a first summator configured to compare a received reference pitch-angle Pr with an actual pitch-angle Pa of a turbine blade, said Pa-value is provided by a resolver, and the first unit further comprises a first control unit configured to regulate the pitch-angle of the turbine blade;
 an electrically connected second unit comprising a second summator configured to compare a reference-speed Sr received from the first unit with an actual speed Sa of the rotational speed of the motor, measured by the resolver;
 a second control unit configured to regulate the rotational speed of the motor;
 an electrically connected third unit comprising a third summator configured to compare the reference torque Tr of the motor, said value is received from the second unit, with the actual torque Ta of the motor and the third unit further comprises a third control unit configured to regulate the torque of the motor;
 a first overload unit between the third unit and the motor; and
 a second overload-unit configured to receive an error-speed-signal Se which is the difference between Sr and Sa registered by the second unit, said second overload unit is configured to compare Se with a maximal allowable speed value Smax, and the second overload unit is configured to send a signal to the motor at which signal the torque performance of the motor is regulated.

7. A method of using the electrical pitch-control system according to claim 6 for carrying out the method according to claim 1.

* * * * *